United States Patent [19]

Robare

[11] 4,400,816
[45] Aug. 23, 1983

[54] CONTROLLED STOP CIRCUIT FOR FURNACES

[75] Inventor: Arthur P. Robare, McMinnville, Oreg.

[73] Assignee: Cascade Steel Rolling Mills, Inc., McMinnville, Oreg.

[21] Appl. No.: 372,150

[22] Filed: Apr. 27, 1982

[51] Int. Cl.³ .............................................. H05B 0/00
[52] U.S. Cl. .................................................. 373/104
[58] Field of Search ................. 373/102, 104, 105, 50

[56] References Cited

U.S. PATENT DOCUMENTS

| 2,717,326 | 9/1955 | Gunton | 373/105 |
| 2,773,112 | 12/1956 | Grebe et al. | 373/105 |
| 3,823,243 | 7/1974 | Vitale et al. | 373/105 |

FOREIGN PATENT DOCUMENTS

| 474493 | 6/1951 | Canada | 373/105 |

*Primary Examiner*—R. Envall
*Attorney, Agent, or Firm*—Klarquist, Sparkman, Campbell, Leigh, Whinston & Dellett

[57] ABSTRACT

A controlled stop circuitry which frees the operator for carrying out other duties of cycle-interrupt time, by being automatically operable, when once activated, to partially raise the electrodes and to open the transformer switch, but only after the electrode current has decreased to a safe value. More particularly, the circuitry when actuated in a designated manner, interrupts an operating cycle by raising the electrodes, while simultaneously sensing the current supplied to them, and is effective, when the current decreases to a safe level, to automatically open the transformer switch and stop movement of the electrodes in partially raised positions. The circuitry also permits, as an option to the above procedure, the carrying out of the above steps, except that it delays opening of the transformer switch until the electrodes reach the top of their travel. The present invention further contemplates a controlled stop circuitry so designed that it can be readily patched into an existing furnace control system in such a manner as to give the operator the option of using the system in its usual fashion, or of using the controlled stop circuitry in its intended fashion.

5 Claims, 1 Drawing Figure

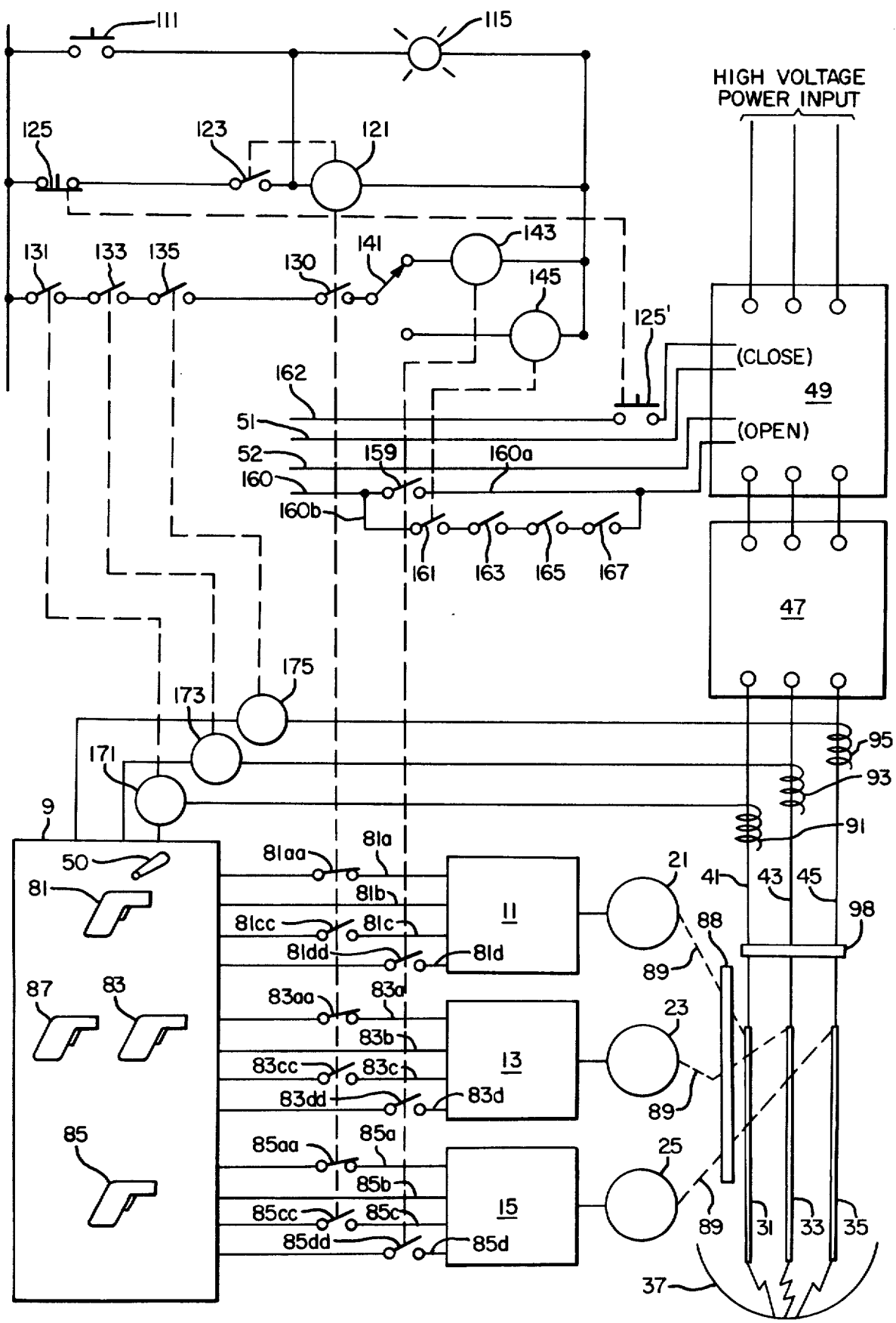

4,400,816

CONTROLLED STOP CIRCUIT FOR FURNACES

BACKGROUND OF THE INVENTION

This invention relates to stop circuits for electric arc furnaces.

Furnace control systems for electric arc furnaces have many functions, two of the most important being to control the supply of electrical energy to the carbon electrodes, and to control the mechanisms for raising, lowering and stopping the electrodes.

In the typical operation of an electric arc furnace, it is quite normal to interrupt the arcing process several times during a cycle of operation of the furnace, to enable various testing, and sampling operations to be carried out, and for observation purposes. If the operator simply opens the switch in the primary of the power transformer for the electrodes, this step, with a full current load to the electrodes, puts mechanical stresses on the transformer, and also tends to create voltage spikes, which tends to break down insulation, and there are other disadvantages known to those skilled in the art.

The operator is instructed to watch the kiloamp meters (which measure the current to the three electrodes) as the electrodes are raised, and when the current drops to a desired safe level, to open the power switch in the primary of the power transformer. This achieves minimum damage to the transformer and associated equipment.

However, operators are under pressure to perform a number of jobs, and to perform them fast, and in the press of work, occasionally, or sometimes rather often, will simply open the power switch, under full current load, and thereafter raise the electrodes, because this takes less time than trying to monitor the operation, and it frees the operator to do other jobs.

The present invention overcomes the above problems by providing a controlled stop circuitry which frees the operator for carrying out other duties at cycle-interrupt time, by being automatically operable, when once activated, to partially raise the electrodes and to open the transformer switch, but only after the electrode current has decreased to a safe value.

More particularly, the circuitry, when actuated in a designated manner, interrupts an operating cycle by raising the electrodes, while simultaneously sensing the current supplied to them, and is effective, when the current decreases to a safe level, to automatically open the transformer switch and stop movement of the electrodes in partially raised positions.

The circuitry also permits, as an option to the above procedure, the carrying out of the above steps, except that it delays opening of the transformer switch until the electrodes reach the top of their travel.

The present invention further contemplates a controlled stop circuitry so designed that it can be readily patched into an existing furnace control system and make use of certain of the systems components in carrying out the circuitry's functions.

The inventive circuitry is also so designed that it can be patched into the furnace control system in such a manner as to give the operator the option of using the system in its usual fashion, or of using the controlled stop circuitry in its intended fashion.

The invention will be explained in connection with the accompanying drawings, wherein the single FIGURE is a schematic drawing of a system embodying the concepts of the present invention.

The controlled stop circuitry of the present invention has been incorporated in, and is a modification of, the furnace control system of a furnace owned by Cascade Steel Rolling Mills, Inc. of McMinnville, Oregon. This system was purchased from Lectromelt of Pittsburgh, Pennsylvania, under the brand name "Lectrostat Electrode Positioning Control System." The automatic electrode regulating portion of the system was produced by Wer Industrial of Grand Island, New York.

The make up and operation of the purchased system will be first explained, in order that the modification of it, by the controlled stop circuitry, will be better understood. Referring to the drawings, the system is diagrammatically shown as being included in part in a control console 9, and in part separately from such console. The system includes three motor control circuits 11, 13 and 15 for three electrode motors 21, 23 and 25, respectively, relative to an arc furnace pot 37. The motor control circuits function as regulators for the movement of the electrodes, which are supplied with electric current by heavy conductors 41, 43 and 45 from the secondary of a main transformer 47. Electric current, from a source not shown, is supplied to the primary of the transformer 47 through an electrically operated vacuum switch 49. The latter is the main power switch for electric current supplied to the furnace, and thus to electrodes 31, 33 and 35.

The main power switch is connected to a three position control switch 50 on the console 9 by a "close" conductor 51 and by an "open" conductor 52. Switch 50 has a central neutral position, and spring return "close" and "open" positions, respectively connected to the conductors 51 and 52. When switch 50 is pushed either way from its neutral position, it will send a signal to the main power switch 49 through either conductor 51 or 52, depending on the way the switch is actuated.

The main power switch is of such design, that whenever signal current is momentarily supplied to it through conductor 51, the switch will close and stay closed, even though signal current supply ceases (which it does). And, whenever signal current is momentarily supplied to it through conductor 52, it will open and stay open, even though signal current supply ceases.

The console 9 has three pistol grip switches 81, 83 and 85 associated respectively with regulators 11, 13 and 15 for controlling their operation. A fourth pistol grip switch 87 is a master switch which provides for group "auto" control, when switches 81-85 are in their "auto" positions, and provides for group manual control, when switches 81-85 are in their "manual at rest" positions.

Each of the pistol grip switches is a four position switch having a single outer position, where it is in its "auto" mode, and three inner positions, one axially aligned with its outer position, where it is in its "manual at rest" mode. Each switch can be twisted (turned) one way from such aligned position, where it is in its "manual raise" mode, or twisted the other way from its aligned position, where it is in its "manual lower" mode. The switches are spring urged to return from the side positions to their central aligned positions.

There are many rather complex electrical connections between the pistol grip switches and the regulators. For simplicity sake only a few of the conductors are shown, and even they, to a degree, may be considered as somewhat conceptual. Also, since the sets of conductors are identical for each switch, only those for switch 81 will now be described. Switch 81 has an "auto" conductor 81*a*, two "manual raise" conductors labeled 81*b* and 81*c*, and a "top-of travel" conductor, 81*d*.

Conductors 81*a* and 81*b* are part of the purchased system, while conductors 81*c* and 81*d* are part of the controlled stop circuitry of the present invention. That circuitry includes normally closed relay contacts 81*aa* in conductor 81*a*. It is convenient to now mention that conductor 81*c* has normally open contacts 81*cc*, while conductor 81*d* has normally open contacts 81*dd*.

The conductors for the other switches and their relays are labeled with subscripts corresponding to the numbering of the switches.

For convenience in description, the conductors between the console 9 and the regulators, will be called intertie conductors. Through these, the pistol grip switch can instruct the regulators to raise all the electrodes, or to lower them, or to stop them in at rest positions.

Electrically operated brakes 88 are provided for the electrodes, and are so incorporated in the system that they automatically engage to positively hold the electrodes against movement, whenever the switches are moved to their inner "at rest" positions, but automatically release whenever the switches are moved to any of their other positions. Note that switches 81–87, when in "auto," have an interlock to the main power switch. Thus, if the latter is open, the brakes will engage.

While the brakes are shown next to the electrodes, they do not actually engage them, but instead engage mechanisms indicated diagrammatically at 89, which actually raise and lower the electrodes.

There are current sensing coils 91, 93 and 95 which are associated with the conductors 41–45, and which supply current information to the regulators.

The purchased system works as follows: assume that it is start up time, and that switch 50 is in its central inactive position, and that the pistol grip switches are in their inner "manual at rest" positions, so that the brakes 88 are set. The operator must first actuate switch 50 to close the main power switch 47, or else an interlock (not shown) to the brakes will not be released.

Then the operator pulls switches 81–85 to their outer "auto" positions, and then does the same for master switch 87. When this occurs, the regulators are directed to individually react to the current sensed in the coils 91–95. If there is none, the regulators lower the electrodes until an arc is established. When this occurs, the current drawn is usually greater than a predetermined selected value, so that the regulators raise the electrodes until the desired value is attained. The arc melting cycle now continues, with the electrodes gradually lowered as the metal scrap, etc., melts and sinks.

The operator will need to partially raise the electrodes several times during a cycle for tests, etc. He accomplishes this by using the "manual raise" mode of the master switch 87.

Whenever the electrodes are raised, the operator is supposed to watch the kiloamp meters and open the main power switch 49 only after the current drops to a safe level. Sometimes, or many times, he opens the switch too soon. This will shorten the life of the transformer and have other ill effects.

When the cycle of operation is to be terminated, the operator not infrequently follows the above sequence, in raising the electrodes to their top positions.

As the electrodes reach their top-of-travel positions, limit switches, schematically shown at 98, trigger override relays (not shown) which send signals to the regulators to stop electrode travel and to set the brakes. This occurs even though the operator is holding the master switch in its "manual raise" position, because the override relays are arranged to negate the raise instructions being sent by the master switch to the regulators, and to substitute stop and hold instructions in their place.

The controlled stop circuitry of the present invention overcomes the difficulty of premature opening of the main power switch. The circuitry includes a push button stop switch 111 associated with an indicator lamp 115. When the switch is closed, it causes a relay 121 to be energized. The relay will close a number of relay contacts, among them contacts 123, which are in series with a normally closed restrike switch 125. The contacts 123 constitute a holding circuit, so that relay 121 remains energized despite release of pressure on the push button switch 111.

Relay 121 also closes relay contacts 130, opens relay contacts 81*aa*–85*aa*, and closes relay contacts 81*cc*–85*cc*. Contacts 130 are in series with three sets of relay contacts 131, 133 and 135 (about which more will be presently said), and also are in series with a selector switch 141. The latter has a "part" position leading to relay 143, and a "full" position leading to a relay 145. Relay 143 controls the status of relay contacts 159 in the upper leg 160*a* of an "open" conductor 160, and also the status of relay contacts 81*dd*–85*dd* in the intertie conductors. Relay 145 controls the status of relay contacts 161 provided in the lower leg 160*b* of conductor 160. The lower leg also contains "top-of-travel" relay contacts 163–167. These are associated with limit switches 98 to be closed upon actuation of such switches.

The restrike switch 125 has a lower companion switch 125′ located in a "close" conductor 162 which connects control switch 50 to the console 9.

Relay contacts 131, 133 and 135 are controlled by current sensing relays 171, 173 and 175, respectively, which tap into the conductors leading from the current sensing coils 91, 93 and 95, previously mentioned.

In the description of the operation of the inventive circuitry, for simplicity, reference will be made only to the intertie conductors for switch 81, it being understood that the corresponding conductors for the other switches are similarly affected.

Now, assuming that the furnace is in operation and that it is desired to temporarily interrupt the operating cycle by only partially raising the electrodes, and assume that the operator desires to utilize the inventive circuitry to do so. The operator moves the selector switch 141 to its "part" position, and then presses stop switch 111. This energizes relay 121 which closes relay contacts 130. However, this will not energize relay 143 because relay contacts 131–135 are still open. Activation of relay 121 also reverses the status of relay contacts of the intertie conductors, except for having no effect on the contacts for conductors 81*d*–85*d*. The intertie relay contacts may be considered as bypassing contacts, because they bypass the effect of switches 81–87 on the console 9. That is to say, opening of contacts 81*aa* inactivates the "auto" mode, while closure of contacts 81*cc* activates the "manual raise" mode, even though the pistol grip switches are in their "auto" mode.

The electrodes will rise until the current sensing relays sense that the electrode current has dropped to the predetermined "safe" level, whereupon they close the relay contacts 131, 133 and 135. This will energize relay 143 which will close contacts 159 to effect opening of the main power switch, even though the control switch 50 on console 9 is in its neutral position.

Relay 143 will also close contacts 81dd, 83dd and 85dd which gives the regulators "top of travel" signals, even though the regular top of travel switches 98 are open. Thus, the regulators stop raising the electrodes, and related circuitry (not shown) and sets the brakes 88.

To recap: the above operations are initiated by closing the stop switch 111. The operator need do nothing further, since the controlled stop circuitry automatically raises the electrodes until the current drops to a safe value, at which time it stops them at partially raised positions, and automatically opens the main power switch 47 to cut off the supply of current to the electrodes. This frees the operator to perform other duties.

If the operator desires to get back under the control of the furnace control system, he depresses the restrike button 125. This breaks the circuit to relay 121, which deactivates the stop controlled circuitry, opening relay contacts 130, closing relay contacts 81aa, and opening relay contacts 81cc. When contacts 130 open, relay 143 is deenergized to effect closure of relay contacts 81dd. Depressing button 125 also actuates switch 125' which effects closure of the main power switch 49 through conductor 162. Now the system is back in "auto" mode (the console switches having remained in this status), so that the electrodes are again lowered into the pot.

Assume that it is desired to stop the operating cycle and raise the electrodes to the top. The operator adjusts selector switch 141 to its "full" position, and then punches button 111. Relay 121 is energized to close contacts 130 and the other contacts associated with the relay. Thus the electrodes rise, with the current declining until the safe value is reached, whereupon the current sensing relays close relay contacts 131-135. This completes a circuit through relay 145 which closes relay contacts 161.

However, the top of travel switches 163-167 are still open, so the main power switch 49 remains closed. And note that since relay 145 has no effect on the relay contacts in the intertie conductors, the electrodes continue to rise. When they reach the top of their travel limit switches 98 are closed which sets the brakes 88 and close relay contacts 163-167. Since contacts 161 are closed, a circuit through conductor 160b is completed to effect opening of the main power switch 49.

The operator will now disable the controlled stop circuit by pressing restrike switch 125, to return control to the furnace control system. Note that while the console switches are in "auto" mode, the electrodes remain stationary, because switch 50 is in its neutral position. This means that the main power switch remains open and thus its interlock to the console prevents electrode movement.

In the actual embodiment of the controlled stop circuitry of the present invention, there are dual control consoles for the furnace, one close to the furnace, and the other farther away within a control room. Thus in the actual circuitry, there is a stop switch 111 for each console, an indicator lamp 115 for each such switch, and a restrike switch 125 and a switch 125' for each console. The dual controls have not been shown in the drawings because they would add little to the disclosure and might confuse the unwary.

What is claimed is:

1. In a control circuit for an electric arc furnace having electrode means,
    means for raising the electrode means thereby decreasing the current passing therethrough,
    sensing means for sensing such current and actuable to give a signal when such current decreases to a predetermined value,
    and means responsive to said signal for cutting off the supply of current to, and for stopping travel of, the electrode means.

2. A control system for an electric arc furnace, comprising:
    first means operable when actuated for raising the electrodes of the furnace,
    second means operable when actuated for cutting off the supply of electric current to the electrodes,
    switch means including a manual switch which is operable when actuated to cause said switch means to automatically actuate said first means to raise the electrodes, and to automatically actuate said second means when the electrodes reach a partly raised position.

3. In a control circuit for the electrodes of an electric arc furnace,
    drive means for raising the electrodes thereby decreasing the current drawn by them or for lowering the electrodes,
    brake means for stopping travel of the electrodes,
    means automatically operable when the electrodes reach to top of their travel to set said brake means,
    sensing means for sensing the current supplied to the electrodes,
    responsive means responsive to said sensing means when the current drops to a predetermined value during raising movement of said electrodes for automatically setting said brakes independently of said automatic means,
    and control means for activating or inactivating said responsive means.

4. In a control circuit for the electrodes of an electric arc furnace,
    drive means for raising the electrodes thereby decreasing the current drawn by them or for lowering the electrodes,
    brake means for stopping travel of the electrodes,
    power switch means having a closed position to supply current to the electrodes, and an open position to cut off said supply,
    sensing means for sensing the current supplied to the electrodes,
    plural switch means for activating or deactivating said drive means,
    control switch means effecting opening or closing of said power switch means,
    activating means for activating said brake means at the predetermined upper positions of the electrodes,
    independent switch means so interrelated to all of the above means, that when said independent switch means is moved to its operable position it
    (a) causes the electrodes to rise, independently of said plural switch means,
    (b) responds to a predetermined decreased current value to cause said power switch means to open independently of said control switch means, and to cause actuating of said brake means independently of said activating means.

5. A control circuit as described in claim 4, wherein there is a selector switch means having a first position and a second position and so related to said independent switch means that in said first position said independent selector switch means effects the results above recited, but in a second position said independent selector switch means has no effect on said activating means and effects opening of said power switch means only when the electrodes reach said predetermined upper positions.

* * * * *